United States Patent [19]
Green et al.

[11] Patent Number: 6,113,967
[45] Date of Patent: Sep. 5, 2000

[54] COOKING AND COOLING PROCESS

[75] Inventors: Winje Green, Persiljevagen; Lars Bolmlund, Hoganas, both of Sweden

[73] Assignee: Formcook AB, Helsingborg, Sweden

[21] Appl. No.: 09/358,492

[22] Filed: Jul. 22, 1999

[30] Foreign Application Priority Data

Sep. 24, 1998 [SE] Sweden .................................. 9803236

[51] Int. Cl.⁷ ..................................................... A23L 1/00
[52] U.S. Cl. ............................................ 426/523; 426/524
[58] Field of Search ................................. 426/523, 524, 426/233

[56] References Cited

U.S. PATENT DOCUMENTS 4,555,914 12/1985 Kanto et al. ............................... 62/380
4,565,704 1/1986 Dagerskog et al. ..................... 426/233
5,077,072 12/1991 Sieradzki ................................ 426/523

FOREIGN PATENT DOCUMENTS 1314165 12/1989 Japan .

Primary Examiner—George C. Yeung
Attorney, Agent, or Firm—Breiner & Breiner

[57] ABSTRACT

The invention refers to a method for continuously cooking and cooling flat food products (2) in direct contact with two endless belts (3,4) arranged on opposite sides thereof. The heat accumulated during cooking is removed during cooling by conduction, the cooling being immediately following the cooking and commenced before the completion of the cooking of the food products.

4 Claims, 1 Drawing Sheet

COOKING AND COOLING PROCESS

FIELD OF THE INVENTION

The invention relates to a combined cooking and cooling process. More specifically, the invention refers to a process for continuously cooking and cooling a flat food product in direct contact with an endless belt.

BACKGROUND OF THE INVENTION

In modern industrial processes using automatic and continuous food cooking machines, the foodstuff is heat treated on an endless belt. In a continuous food cooking machine a grilling or frying of food products is accomplished by placing them between parallel endless conveyor belts, where they are roasted. Furthermore, many flat food products are nowadays subjected to contact cooking in a device, in which they are squeezed or compressed between two surfaces.

After the heat treatment of the foodstuff the product has to be cooled for consumption or further conservation. In this connection cooling refers to a process wherein heat is removed from the product without the formation of ice.

In order to properly treat the foodstuff it is important to reduce the destruction processes in the food, which are microbiological, chemical, biochemical or physical. It is thus important that the foodstuff is rapidly cooled. This can be difficult since foodstuffs mostly are poor heat conductors, especially for products which have been heated above the critical temperature interval for microbial growth of 10–50° C., an interval that has to be passed during the cooling procedure.

In one commonly used cooling method the foodstuff is after the heat treatment transported through a tunnel with circulating cold air. The heat transfer can be increased by increasing the speed of the air-flow, which together with the temperature of the air is adapted to the individual product.

When the food product is exposed to such an air-flow in an open atmosphere moisture will be lost, and there is a risk of the product being experienced as dry. These losses can amount to about 2–3% of the total weight of the product.

Furthermore, the evaporation and the condensation of the steam formed during such cooling processes can cause problems with the product when the cooling process is immediately followed by a freezing process. Then ice will be formed on the freezing elements. This reduces the capacity of the facility which then has to be repeatedly defrosted.

Apart from passing the critical temperature interval for microbial growth the food product is during the traditional cooling with air inevitably exposed to contaminating microorganisms if no extreme precautions are taken. These microorganisms can cause serious effects during the further handling of the food product.

OBJECTS OF THE INVENTION

The object of the invention is to bring about a method for a combined cooking and cooling of a flat food product whereby the above mentioned drawbacks of the known techniques are eliminated, the dimensions of subsequent.

DESCRIPTION OF DRAWINGS

In order to further explain the invention reference is given to the accompanying drawing in which FIG. 1 schematically shows a cross sectional view of a cooking and cooling unit suitable for the method according to the invention.

DETAILED DESCRIPTION OF PRESENTLY PREFERRED EMBODIMENTS

According to the invention a flat food product is first cooked and then immediately subjected to a cooling procedure. During the cooking the food products to be processed are placed as discrete pieces on an endless belt and are continuously transported into a processing chamber for heat treatment of the food product. The type of continuous cooking system is in no way limiting for the inventive method. Flat food products can be treated with steam and/or hot air on an endless belt as well as grilled or fried between parallel endless conveyor belts.

Figure 1:
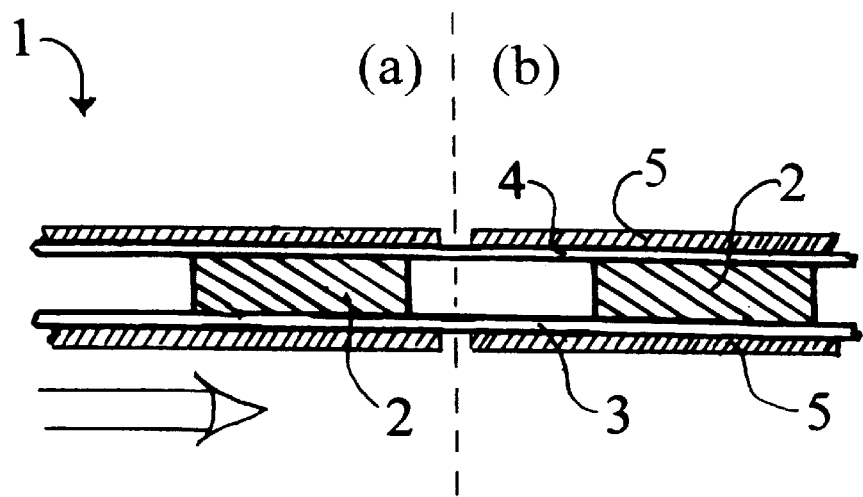

Thus, with reference to FIG. 1, the continuous procedure is performed in a cooking and cooling unit 1 as indicated by an arrow. Flat food products 2 to be treated are arranged on a first endless belt 3, the food products and the belt being in close contact with each other. The food products are cooked in a cooking zone (a) which is immediately followed by a cooling zone (b), the two zones being schematically separated by a hatched line. The heat produced in zone (a) from the first endless belt 3 by means of e.g. thermal conduction is accumulated during the cooking process in the food products 2 and removed from the same in zone (b) also by means of thermal conduction from the underside of the food products via contact with the same endless belt.

The cooling of the food products is facilitated by a second endless belt 4 being arranged on the top of the flat food products 2, both belts having the same velocity. The second endless belt 4 is also in close contact with the flat food products 2, the heat transfer from the food products being accomplished from below as well as from above. Of course, the second endless belt 4 can be used also in the cooking zone (a) but its primary function is to enhance the cooling effect.

One or both of the endless belts 3, 4 can be the same endless belt that was used in zone (a), but can also be one or two separate belts.

The endless belts are made of a material having good heat conductive properties. Preferably, the endless belts comprise polytetrafluoroethylene (PTFE) belts. The cooling is accomplished by cooling plates 5 being positioned over and under the belts, respectively, in close connection with the same when moving.

The direct transfer of heat from the flat products 2 to the endless belts 3, 4 is facilitated by a slight over-pressure being applied by the endless belts on both sides of the products 2. In this way a more rapid temperature reduction is obtained. For example, the compression from previous contact cooking is continued in the cooling unit 1.

The cooling temperature depends on the belt velocity through the cooker and the cooling unit, the cooking temperature, the thickness of the product etc. The cooling temperature can be varied from the temperature of tap water, i.e. plus 10–12° C., to minus 10–15 C., which can be accomplished with for example solutions of glycol or calcium chloride as cooling medium circulating in the cooling plates 5.

An important aspect of the inventive method is that a heat treatment of the product is immediately followed by a cooling of the product from one or both sides. With only one unit for cooking as well as cooling the parameters used for cooling are restricted with reference to cooling time, height of the product etc. For example, if one product of a certain thickness is heat treated and subsequently cooled and then another product is treated for another period of time the cooling has to be performed in a second cooling unit in close connection to a first cooking unit. Thus, a more flexible cooking and cooling facility is obtained in which different products can be treated according to the invention with different process parameters. A net or the like can be arranged between the cooking and cooling zones, overflow of melted fat being removed.

Accordingly, the cooling unit can directly follow the cooker for heat treatment of the product or be integrated in the cooker. In both cases a continuous food cooker having two parallel endless belts is suitable for food products having two parallel surfaces, e.g. hamburgers. In this connection the same lower belt can be used for heating as well as cooling of the product while one upper belt is used for heat treatment and another for cooling.

A great flexibility of cooking and cooling foodstuff is achieved by means of the method according to the invention, i.e. many different types of products can be treated. In principle, there are no limits for the kind of products which can be processed. All foodstuffs are suitable and includes for example cereals, vegetable products, meat, fish, poultry, mixed meat products etc. Also dough products can with preference be treated by means of this method.

The method of the invention is based on the course of events that take place in the product during heating, a temperature gradient being formed between the surface and the central parts of the product. If the product contains water, there is also a mass transport of liquid in the opposite direction from the central parts towards the surface. This mass transport results from the striving towards an equilibrium in the product of the same water content and is driven by an evaporation of the liquid from the surface.

When a temperature gradient encounters a mass transport of cold liquid the heat from the temperature gradient will move slower or faster in dependence of the mass transport in the product, which in turn depends on the water content of the product. Thus, when heated to the same temperature products with a high water content will have a considerable evaporation and will thus be heated slower than products of lower water contents. Of course, other parameters also influence the temperature gradient.

When according to the invention the process then is reversed during the cooling of the product, conductive endless belts being in direct contact with the surface of the product, the liquid on its way to be evaporated on the surface will be halted by the cooling zone formed in the surface layer of the product. This zone is established by the formation of condensed liquid which again penetrates the product. This means that the temperature gradient will be formed more rapidly by the mass transport of liquid being stopped and liquid on its way to the surface being returned into the product. Thus, the already heated liquid in this boundary layer will move towards the central parts of the product. This results in a more effective cooling by the direction of the liquid transport being changed when products are subjected to the cooking and cooling method according to the invention.

Figure 2:
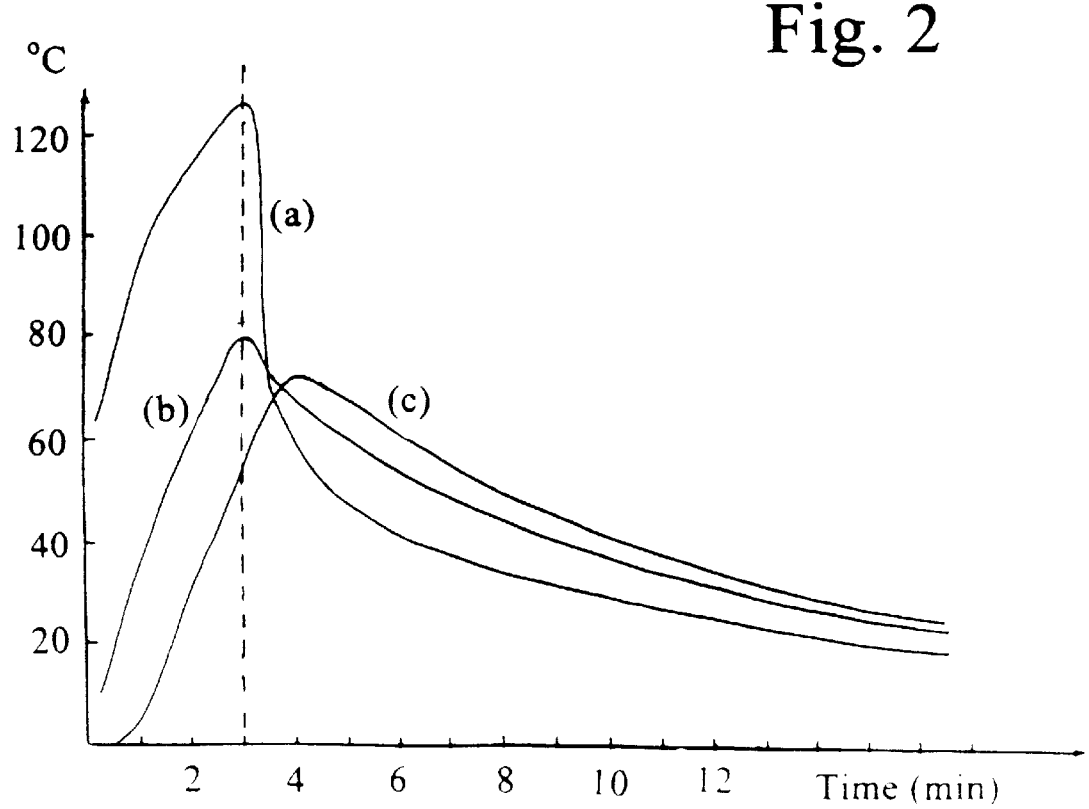
FIG. 2 shows the results obtained with hamburgers which have been subjected to the method of the invention, wherein (a) is the surface temperature, (b) is the mean temperature, and (c) is the core temperature of the product.

FIG. 2 shows the temperature profile of 16 mm thick hamburgers when subjected to the combined cooking and cooling procedure according to the invention. The cooking of the hamburgers was performed for 3 min, which is shown as a dashed line in the figure. The heat treatment was then interrupted by a cooling at a cooling temperature of 10° C. with pressure applied on both sides of the product.

The surface temperature (a) and the core temperature (c) of the product were monitored by means of a thermo-couple placed between the product and the PTA belt or inside the product, respectively. The mean temperature (b) is a measure of the temperature for equalization of the product. More specifically, this measure comprises the total energy content of the product and is obtained by means of calorimetric measurements.

When processed according to the method of the invention the cooking of the product is immediately interrupted by cooling. The heat treatment as well as the cooling from both sides of the product with a slight pressure from the endless belts results in that the surface temperature (a) of the product decreases drastically, while the core temperature (c) of the product at this point is increased since no condensation of steam will take place from the product as explained above. The mean temperature (b) also decreases when the cooling is commenced. All the temperatures will eventually coincide in time.

These results should be compared with those obtained with a cooling procedure according to the state of the art with circulating air (not shown). After the cessation of the heating of the product the surface temperature will in this case not obtain such a steep decline as in FIG. 2 since an evaporation from the product will take place all the time. The core temperature will not increase, neither will it obtain such a low temperature as when treated according to the invention, and will together with the mean temperature follow a more flat and leveled course.

According to one embodiment of the invention, the cooking and the cooling of the food product takes place on the same band. This means that the risk of reinfection by microorganisms is minimized, especially if the food product is subjected to contact cooking on both sides at the same time between parallel endless conveyor belts. By subjecting the surface of the flat food product to high temperature frying, it will in practice be sterilized. Since the product remains on the same place during the cooling procedure no organisms will have access to the heat treated surface.

From a bacteriological point of view products processed according to the method of the invention have not been exposed to open air, i.e. they are not subjected to reinfection by microorganisms. The products are all the time protected by at least one endless belt, the products being physically prevented from contamination. Thus, considerably much better bacteriological values are obtained in products processed by means of the method according to the invention than in products which have been cooked and cooled according to the state of the art with free access of contaminating microorganisms from the air. Furthermore, the bacterial growth of already existing organisms in the products will be very low due to the rapid fall in temperature during cooling.

The two methods were compared by determining the total counts of bacteria obtained immediately after the cooking and cooling procedures. The results obtained after 2 weeks of storing at the cooling temperature of 10° C. showed an significantly lower amount of bacteria for products subjected to the method according to the invention.

The method according to the invention does not only bring about a more effective cooling but also a more effective heat treatment of the food products. Such properties as taste, smell, texture and appearance are not affected when a product is processed according to the invention. The evaporation losses in the products are eliminated which normally are achieved when a product enters an open atmosphere. This favourable water content also results in a increased product quality.

By processing flat food products according to the invention the total loss of weight is reduced by 6% for 8 mm thick hamburgers and by 2% for 16 mm thick patties in comparison with a cooking and cooling procedure according to the state of the art. Similarly, the cooling time is considerably reduced (i.e. by 25–30%).

In addition, the subsequent processing of the product, such as freezing, will be more cost efficient since no evaporation and condensation of the steam takes place. When food products are further processed in freezers these do not have to be of such great dimensions as the equipment used with the customary cooling since less ice is obtained in a freezer which is arranged after a cooking and cooling facility operated according to the invention.

What is claimed is:

1. A method for continuously cooking and cooling flat food products on an endless belt, including removing heat accumulated in cooking during cooling by conduction, said method comprising providing said food products in direct contact with two endless belts which are arranged on opposite sides of said food products, and said cooling immediately follows said cooking and commences before said cooking of said food products is completed.

2. The method as claimed in claim 1 wherein a slight overpressure is applied by said endless belts on said food products.

3. The method as claimed in claim 2 wherein said endless belts comprise polytetrafluoroethylene.

4. The method as claimed in claim 1, 2 or 3 wherein cooling means are arranged in close connection with said endless belts.

* * * * *

UNITED STATES PATENT AND TRADEMARK OFFICE
CERTIFICATE OF CORRECTION

PATENT NO. : 6,113,967
DATED : September 5, 2000
INVENTOR(S) : Winji Green et al It is certified that error appears in the above-indentified patent and that said Letters Patent is hereby corrected as shown below: On the title page:

, second inventor, "Bolmlund" should read -- Holmlund --.

Column 1, line 63, after "subsequent" insert -- freezers being reduced and an increased product quality being obtained --.

Signed and Sealed this

Twenty-fourth Day of April, 2001

Attest:

NICHOLAS P. GODICI

Attesting Officer     Acting Director of the United States Patent and Trademark Office